Patented Feb. 11, 1941

2,231,467

UNITED STATES PATENT OFFICE 2,231,467

HIGH SURFACE HIDING PIGMENT MATERIALS AND PROCESS OF MAKING THE SAME

Marion L. Hanahan, Wilmington, Del., assignor to E. I. du Pont de Nemours & Company, Wilmington, Del., a corporation of Delaware No Drawing. Application December 8, 1938, Serial No. 244,569

17 Claims. (Cl. 134—58)

The invention relates to the art of white pigment materials. More particularly it relates to the improvement of the properties of white pigment materials. Still more particularly it relates to the improvement of the hiding power of white pigment materials in flat paint formulations, paper coating compositions, etc.

Flat paint formulations, which are used so widely for inside painting, contain white pigment materials such as titanium oxide, titanates of divalent metals, lithopone, zinc sulfide, zinc oxide, white lead, and the like, comprising prime white pigments having a refractive index of not less than about 1.9. It is commonly thought in the art that the hiding and brightening power of a white pigment material when used in coating compositions applied to wood, metal, paper, linoleum, oil cloth, and the like, or when used as a filler in paper, rubber, and the like, is dependent entirely upon the index of refraction, color, and ultimate particle size of said pigment. I have discovered, however, that such is not always the case. While such properties as index of refraction, color, and ultimate particle size always do exert an effect, I have found that when the pigment is used in certain coating compositions, such as flat paint formulations and casein and starch paper coating compositions, and when used as a filler such as a paper filler, its hiding power is dependent to a certain extent on pigment oil absorption and to a remarkable and hitherto unrealized extent on a property which I call "surface hiding power" and which I shall discuss herein in more detail.

Pigments with high surface hiding power have hitherto been unknown. Now, however, I have discovered a process whereby the property of high surface hiding power may be imparted to white pigment materials, thereby producing unique pigments of tremendous industrial importance. Such pigments have particularly high hiding power in flat paint formulations and as a result, have high flat hiding power in such formulations. Furthermore, they have high opacifying power in paper, and in starch and casein coating compositions applied to the surface of paper. As a matter of fact, I have discovered that pigments having the property of high surface hiding power produce high hiding, opacifying and/or brightening in all pigment-adhesive systems in which the mean index of refraction of the adhesive system is substantially lower than 1.5. A sheet of paper, for example, can be considered to be an adhesive comprising essentially paper fiber of index of refraction of approximately 1.53 and air of index of refraction of 1. The mean index of refraction of said adhesive is substantially lower than 1.5 and white pigments therein having high surface hiding power are definitely better opacifying and brightening agents than are comparable prior art low surface hiding power pigments of essentially equal index of refraction, color, and ultimate particle size. Again, flat paint films, in which I have found high surface hiding pigments to be so effective, comprise numerous void spaces and/or pigment-air interfaces. As a consequence, the effective mean index of refraction of the adhesive portion is substantially lower than that of the binder portion, e. g. is substantially lower than 1.5. I have discovered, however, that in pigment-adhesive systems in which the effective mean index of refraction of the adhesive approximates or exceeds 1.5, such as enamel paint films in which the pigment is essentially immersed in the binder, the property of high surface hiding power does not influence the hiding power of a pigment.

For a better understanding of the characteristics desired in pigment materials used in flat paint formulations, it will be necessary to explain the various terms used herein and the method of testing employed:

FLAT PAINT FORMULATION

A flat paint formulation produces a dry paint film in which the binder portion is insufficient to fill all void spaces between pigment particles and which in consequence has a micro rough surface of relatively low specular reflection. Such a paint has a pigmentation in excess of about 40% by volume on the dry film and usually in excess of about 50% by volume.

On the other hand, an enamel paint formulation produces a dry paint film in which the binder portion is sufficient to fill essentially all void spaces between pigment particles and which in consequence has a micro smooth surface of relatively high specular reflection. Such a paint has a pigmentation of less than about 35% by volume on the dry film and usually less than about 30% by volume.

HIDING POWER

Hiding power may be defined qualitatively as that property of a paint which enables it to obliterate beyond recognition any background over which it may be spread. Mathematically, it may be expressed as square feet per gallon of paint.

It is determined by the procedure entitled

"Krebs dry film incomplete hiding power" described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½″ wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush also filled with the paint, are weighed together. The paint is spread uniformly over the chart with the syringe and then spread with the brush. The syringe and brush are again weighed. Several brushouts, for example, six or eight are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

Weight of standard paint per gal. = 15.69 lbs.
Weight of sample paint per gal. = 13.54 lbs.
Brushout of sample = 5.40 g.
Brushout of standard 1 = 6.50 g.
Brushout of standard 2 = 7.40 g.
Sample rating = 1.4

Hence, weight of standard paint of equivalent hiding is: 6.50+0.4(7.4−6.5) = 6.86 g.
The volume of which is:

$$\frac{6.86 \times 8.33}{15.69} = 3.64 \text{ cubic centimeters}$$

The volume of the sample is:

$$\frac{5.40 \times 8.33}{13.54} = 3.32 \text{ cubic centimeters}$$

The relative hiding power of the sample is:

$$\frac{3.64}{3.32} \times 100 = 110$$

PIGMENT FLAT HIDING POWER

Strictly speaking, the expression "hiding power" should only be applied to paint formulae, i. e. to mixtures of pigment and vehicle. Nevertheless, pigments may be said to possess potential hiding power and the potential hiding power of a pigment in a flat paint formulation may be considered to be its flat hiding power. This flat hiding power is defined as follows:

$$F.H.P. = \frac{\text{Wt. standard pigment per unit vol. standard paint}}{\text{Wt. sample pigment per unit vol. sample paint}} \times H.P.$$

in which F. H. P. is the flat hiding power of the sample pigment and H. P. is the hiding power of the sample flat paint as determined by the hereinbefore described "Krebs dry film incomplete hiding power" procedure.

OIL ABSORPTION

Oil absorption is the amount of oil in grams required to wet 100 grams of pigment.

The method of testing is described on pages 540–541 of Gardner's above cited book.

A five gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

This invention has as an object the production of white pigments the surface hiding power of which have been increased to an extent heretofore unrealized. A further object is to increase the surface hiding power of white pigment materials comprising prime white pigments having an index of refraction of not less than about 1.9. A still further object is to increase the flat hiding power of white pigment materials employed in flat paints. A still further object is to increase the opacifying power of white pigment materials employed as paper fillers and in paper coating. A still further object is to increase the oil absorption of white pigments. A still further object is to increase white pigment dry bulking value, i. e. the volume per unit weight of dry pigment. Additional objects will become apparent from an examination of the following description and claims.

These objects are attained according to the herein described invention which broadly comprises mixing with an aqueous suspension of a white pigment a water soluble acid and a solution of an alkali soluble polymeric carbohydrate derivative which when treated with an acid is converted to an insoluble compound, thereafter dewatering the pigment suspension and drying the pigment, which pigment is coated with an insoluble gel-like polymeric carbohydrate compound.

In a more restricted sense, this invention comprises mixing with an aqueous suspension of a prime white pigment between about 0.25% and about 35%, calculated as polymeric carbohydrate and based on the weight of the pigment before treatment, of a solution of an alkali soluble polymeric carbohydrate derivative which when treated with an acid is converted to an insoluble compound. After the slurry has been agitated sufficiently to insure uniform distribution of the dissolved polymeric carbohydrate derivative, it is acidified, thereby forming a gel-like structure of a polymeric carbohydrate compound as a gel-like coating on the pigment material particles. The slurry is subsequently dewatered, as by filtering, and the pigment dried without calcination.

The preferred embodiment of this invention comprises mixing with an aqueous suspension of a prime white pigment, preferably an aqueous suspension of a wet-milled calcined lithopone, comprising in excess of about 250 grams pigment per liter, between about 1% and about 8%, calculated as cellulose and based upon the weight of the pigment before treatment, of a cellulose xanthate solution. After the slurry has been agitated sufficiently to insure uniform distribution of the added agent, it is acidified, by the addition of sulfuric acid. Subsequently, the slurry is dewatered, as by filtering, and the pigment dried at a temperature between about 110° C. and about 130° C.

The following example is given for illustrative purposes and is not intended to place any restrictions or limitations on the herein described invention:

*Example I*

355 grams cellulose xanthate solution comprising 7% cellulose and 6% NaOH, was added to 2.9 liters of calcined wet milled lithopone slurry containing 1,239 grams of pigment, i. e. the lithopone was treated with 2% cellulose. Dilute sulfuric acid was added to lower the pH to 6.0 and precipitate the cellulose. Bromine water was added in sufficient amount to bleach out the yellow tinge imparted by the xanthate and barium hydroxide was then added to raise the pH to 8.6 The resultant pigment slurry was filtered and the pigment dried at 115° C. and dry milled by passing it through a squirrel cage disintegrator. The treated pigment had an oil absorption of 22.0 whereas an untreated lithopone prepared from the same calcined wet milled lithopone in an analogous manner, except that it was not treated with cellulose, had an oil absorption of only 12.7. In a representative flat paint formulation the hiding power of the treated pigment was 61.2% greater than that of the untreated pigment.

Various arrangements and selections of equipment for the operation of my novel process are possible. In the preferred arrangement, however, I add 2%, on the basis of the pigment, of cellulose in the form of a cellulose xanthate solution to a suspension of pigment in water in a mechanically agitated tank. The suspension is agitated sufficiently to insure complete dispersion of the dissolved cellulose and is then acidified with sulfuric acid, for example, precipitating gel-like cellulose on the surface of the pigment particles. The pigment thus treated is filtered, dried at about 120° C. and after dry milling to break up lumps formed on drying is ready for use.

It is to be understood that the hereinbefore described specific embodiments of my invention may be subject to variation and modification without departing from the scope of this invention. For instance, while the invention has been described with particular application to the treatment of lithopone, the treatment of other types of white pigment materials is also contemplated. Accordingly, the term "white pigment," as employed herein and in the appended claims includes not only lithopone but also those white pigment materials such as titanium oxide, extended titanium oxide pigments, titanates of divalent metals, zirconium oxide, lithopone, zinc sufide, zinc oxide, antimony oxide, white lead, and the like, comprising prime white pigments such as $Sb_2O_3$, $$2PbCO_3.Pb(OH)_2,$$

$PbSO_4$, $PbSO_4.PbO$, $TiO_2$, $CaTiO_3$, $MgTiO_3$, $ZnTiO_3$, $ZnO$, $ZnS$, $ZrO_2$, and the like, having a refractive index of not less than about 1.9, whose pigment properties have been developed by calcination, autoclaving, or other treatment, as by the processes of U. S. Patents 1,704,483, 1,892,693, 1,977,583, 2,006,259, 2,046,054, and the like.

It is further to be understood that in the case of such pigments as titanium oxide, lithopone, and the like, which are calcined during the process of manufacture of said pigments, the treating agent is added to the calcined pigment and not to the pigment before the calcination operation, i. e. it is to be understood that the pigment should not be calcined after addition of the treating agent.

It is still further to be understood that the treating agent employed may be one or any combination of solutions of alkali soluble polymeric carbohydrate derivatives which when treated with an acid are converted to insoluble compounds, said polymeric carbohydrate derivatives being selected from the group consisting of cellulose xanthate, cellulose dissolved in alkali metal hydroxide solution, urea cellulose (produced by the process described in U. S. Patent 2,134,825) dissolved in alkali metal hydroxide solution, sulfates of polymeric carbohydrates such as cellulose sulfate and starch sulfate dissolved in sodium hydroxide, alkali metal salts of carboxyalkyl ethers of polymeric carbohydrates such as sodium starch glycollate and sodium cellulose glycollate, alkali metal salts of acid esters of polymeric carbohydrates such as the sodium salt of the oxalic ester of cellulose and the sodium salt of cellulose phthalic acid, and alkali metal hydroxide solutions of low substituted cellulose ethers whose alkali metal salts are insoluble in water but which are dissolved by 9% sodium hydroxide, such as glycolcellulose, ethyl cellulose and methyl cellulose. It is to be understood that the term "alkali soluble polymeric carbohydrate derivative which when treated with an acid is converted to an insoluble compound" as used herein and in the appended claims includes members of the aforementioned group. However, on account of their greater effectiveness, the treating agents which I prefer to employ are alkali metal hydroxide solutions of cellulose derivatives selected from the group consisting of cellulose xanthate, cellulose, and urea cellulose, which on subsequent acidification are precipitated on the pigment material particles as a gel-like coating of cellulose. Because of the superior results obtained therewith, the cellulose derivative which I prefer to employ as the treating agent in my novel process, is an aqueous sodium hydroxide solution of cellulose xanthate.

It is still further to be understood that acidification of the solutions of the aforementioned alkali soluble polymeric carbohydrate derivatives in the presence of the pigment material particles is an essential feature of my invention. Said acidification forms on the surface of said pigment material particles a gel-like coating of a polymeric carbohydrate compound selected from the group consisting of cellulose, starch, carboxyalkyl ethers of polymeric carbohydrates such as starch glycollic acid and cellulose glycollic acid, acid esters of polymeric carbohydrates such as cellulose phthalic acid, and the oxalic ester of cellulose, and cellulose ethers such as ethyl cellulose and methyl cellulose. It is to be understood that the term "gel-like polymeric carbohydrate compound" as used herein and in the appended claims includes members of the aforementioned acid precipitated group. In most instances, I prefer to add the solution of alkali soluble polymeric carbohydrate derivative to the pigment suspension and, thereafter, to precipitate the polymeric carbohydrate compound on the pigment particles by addition of a water soluble acid, such as sulfuric acid, hydrochloric acid, a phosphoric acid, and the like. However, I may practice the herein described invention by addition of the polymeric carbohydrate derivative solution to a previously acidified pigment suspension, although on account of the ease of manipulation, and the superior results ordinarily obtained thereby, I usually prefer to add the acid after addition of the polymeric carbohydrate derivative solution. In any case, it is desirable that the pigment suspension after treatment with the polymeric carbohydrate derivative solution, and acid, should have a pH of less than about 7, and preferably less than about 6. After the polymeric carbohydrate compound has been precipitated on the pigment particles by reaction of the polymeric carbohydrate derivative solution with the acid, to provide a pigment suspension having a pH of less than about 7, and preferably less than about 6, I have found it desirable to adjust the pH of said pigment suspension to more than about 6 and preferably more than about 7 prior to the dewatering of the said suspension, as by the addition of an alkaline reacting material such as barium hydroxide, sodium carbonate, and the like.

It is still further to be understood that the amount of treating agent required by a given pigment material can best be learned by experimental trial and the amount will vary with the treating agent, the type and previous history of the pigment material, the precipitating conditions, and the properties desired in the finished pigment. With the agent which I have found most satisfactory, viz., cellulose xanthate, appreciable effects are had by addition of the cellulose xanthate in an amount corresponding to as little as about 0.25%, and in an amount equivalent to as high as about 35%, calculated as cellulose and based upon the weight of pigment in the slurry. For optimum effects, however, I prefer to add the cellulose xanthate in amounts equivalent to from about 1% to about 8% cellulose. Percentages of gel-like structure materials higher than about 35% result in decreased surface hiding power.

It is still further to be understood that drying of the white pigment coated with a gel-like polymeric carbohydrate compound is an essential step in my novel process. It is essential that the pigment after being coated with the gel-like agent should not be calcined. I have found it desirable to dry said pigment at a temperature not in excess of about 200° C., and preferably not in excess of about 150° C. Temperatures of less than about 100° C. should be avoided unless the pigment is dried at sub-atmospheric pressures.

The herein described process imparts to pigment materials a new property which I call surface hiding power. The treating agent forms an amorphous gel surrounding the pigment particles. Upon drying, this leaves a system of pigment particle aggregates stabilized by a skeleton structure of the gel. Thus the treated pigment is more porous and bulky than the untreated pigment. As a consequence of my novel treatment there are imparted to pigment materials not only the property of surface hiding power, but also the properties of hitherto unrealized high oil absorption, high dry bulking value, high flat hiding power, and high opacifying and brightening power in paper and in coating compositions of casein, starch and the like applied to the surface of paper.

Minor increases in surface hiding power are of little industrial importance. Therefore, the pigments produced according to my novel process, as compared with prior art pigments, have an increase of at least about 10% and preferably at least about 15% in oil absorption, flat hiding power, and dry bulking value. Further, the opacifying and brightening power of coatings of casein, starch, and the like, when applied to paper, is increased at least about 10% and preferably at least about 15%.

It is to be understood that the increase in flat hiding power mentioned herein above, refers to the percentage increase in flat hiding power of a treated pigment as compared to the same pigment before treatment by my novel process, when determined according to the hereinbefore described pigment flat hiding power test in a flat paint composition comprising 25.8% pigment by volume, 25.92% 50 gal. limed rosin varnish, 4.18% acid refined linseed oil of acid No. 5, and 44.1% petroleum spirits.

My process possesses advantages not previously combined in a single process. Furthermore, the products of my process possess advantages not previously combined in a pigment material. The high surface hiding pigment resulting from the operation of my process, when used in flat paint formulations, imparts heretofore unrealized high hiding to the dry paint film. Such paint formulations are prepared at essentially the same cost and are far superior to flat paints hitherto manufactured. Furthermore, the novel pigment products of my invention when employed as paper fillers or in compositions of starch, casein, glue, and the like, applied to the surface of paper, produce papers which are definitely superior in opacity and brightness than those pigmented in an analogous manner with corresponding prior art pigments.

As many apparently widely different embodiments of this invention may be made without departing from the spirit and scope thereof, it is to be understood that I do not limit myself to the specific embodiment except as defined in the appended claims.

Having described the present invention the following is claimed as new and useful.

1. A process for producing a pigment of improved surface hiding power which comprises mixing with an aqueous suspension of a white pigment, a water soluble acid and between about 0.25% and about 35%, calculated as polymeric carbohydrate and based on the weight of the pigment before treatment, of an alkaline solution of an alkali soluble polymeric carbohydrate derivative which when treated with an acid is converted to an insoluble compound, the pH of the suspension after treatment with the polymeric carbohydrate derivative and acid being less than about 7 thereby forming on the surface of said pigment material particles a coating of a gel-like polymeric carbohydrate compound, thereafter dewatering the pigment suspension and drying the pigment at a temperature not in excess of about 200° C.

2. A process for producing a pigment of improved surface hiding power which comprises mixing with an aqueous suspension of a white pigment between about 0.25% and about 35%, calculated as polymeric carbohydrate and based on the weight of the pigment before treatment, of an alkaline solution of an alkali soluble polymeric carbohydrate derivative which when treated with an acid is converted to an insoluble compound, thereafter acidifying the slurry to a pH of less than about 7, thereby forming on the surface of said pigment material particles a coating of a gel-like polymeric carbohydrate compound and thereafter dewatering the pigment slurry and drying the pigment at a temperature not in excess of about 200° C.

3. A process for producing a pigment of improved surface hiding power, which comprises mixing with an aqueous suspension of a white pigment a water soluble acid and between about 0.25% and about 35% calculated as cellulose and based on the weight of the pigment before treatment, of an alkali metal hydroxide solution of a cellulose compound selected from the class consisting of cellulose xanthate, cellulose, and urea cellulose, the pH of the suspension after treatment with the cellulose compound solution and acid being less than about 7, thereby precipitating the cellulose as a gel-like coating on said pigment, dewatering the pigment suspension and drying the pigment at a temperature not in excess of about 200° C.

4. A process for producing a pigment of improved surface hiding power which comprises mixing with an aqueous suspension of a white pigment between about 0.25% and about 35%, calculated as cellulose and based on the weight of the pigment before treatment, of an alkali metal hydroxide solution of a cellulose compound selected from the class consisting of cellulose xanthate, cellulose, and urea cellulose, acidifying the slurry to a pH below about 7 and thereby precipitating the cellulose as a gel-like coating on said pigment, and thereafter dewatering the pigment slurry and drying the pigment at a temperature not in excess of about 200° C.

5. A process for producing a pigment of improved surface hiding power which comprises mixing with an aqueous suspension of a white pigment between about 1% and about 8%, calculated at cellulose and based on the weight of the pigment before treatment, of an alkali metal hydroxide solution of cellulose xanthate, and a water soluble acid, the pH of the pigment suspension after treatment with the cellulose xanthate solution and acid being below about 6 thereby precipitating the cellulose as a gel-like coating on said pigment, dewatering the pigment suspension and drying the pigment at a temperature not in excess of about 150° C.

6. A process for producing a pigment of improved surface hiding power which comprises mixing with an aqueous suspension of a white pigment between about 1% and about 8%, calculated as cellulose and based on the weight of the pigment before treatment, of an alkali metal hydroxide solution of urea cellulose, and a water soluble acid, the pH of the pigment suspension after treatment with the urea cellulose solution and acid being below about 6 thereby precipitating the cellulose as a gel-like coating on said pigment, dewatering the pigment suspension and drying the pigment at a temperature not in excess of about 150° C.

7. A process for producing a pigment of improved surface hiding power which comprises mixing with an aqueous suspension of a white pigment between about 0.25% and about 35%, calculated as cellulose and based on the weight of the pigment before treatment, of an alkali metal hydroxide solution of cellulose xanthate, acidifying the slurry to a pH below about 6, dewatering said slurry and drying the pigment at a temperature not in excess of about 200° C.

8. A process for producing a pigment of improved surface hiding power which comprises mixing with an aqueous suspension of a white pigment between about 1% and about 8%, calculated as cellulose and based on the weight of the pigment before treatment, of an alkali metal hydroxide solution of cellulose xanthate, acidifying the slurry to a pH below about 6 by the addition of sulfuric acid, and subsequently dewatering the slurry and drying the pigment at a temperature not in excess of about 150° C.

9. A pigment of improved surface hiding power which comprises a white pigment coated with between about 0.25% and about 35% calculated as polymeric carbohydrate and based on the weight of the pigment before treatment of an acid-precipitated gel-like polymeric carbohydrate compound.

10. A pigment of improved surface hiding power which comprises a white pigment coated with acid-precipitated gel-like cellulose in an amount in the range of from about 0.25% to about 35%, calculated as cellulose and based on the weight of the pigment before treatment.

11. An improved pigment comprising a white pigment coated with between about 1% and about 8%, calculated as cellulose and based on the weight of the pigment before treatment of an acid-precipitated gel-like cellulose material, said improved pigment having at least about 10% higher flat hiding power than a comparable untreated pigment.

12. A process for producing a pigment of improved surface hiding power which comprises mixing with an aqueous suspension of a white pigment, a water-soluble acid and an alkaline solution in an amount equivalent to between about 0.25% and about 35% calculated as cellulose and based on the weight of the pigment before treatment of an alkali soluble cellulose derivative which when treated with an acid is converted to an insoluble compound, the pH of the pigment material suspension after treatment with the cellulose derivative and acid being less than about 7, thereby forming on the surface of said pigment particles a coating of a gel-like cellulosic compound, thereafter dewatering the pigment suspension and drying the pigment at a temperature not in excess of about 200° C.

13. A pigment of improved surface hiding power which comprises a white pigment coated with between about 0.25% and about 35%, calculated as cellulose and based on the weight of the pigment before treatment, of an acid-precipitated gel-like cellulosic compound.

14. A process for producing a pigment of improved surface hiding power which comprises mixing with an aqueous suspension of a wet-milled calcined lithopone pigment between about 1% and about 8%, calculated as cellulose and based on the weight of the pigment before treatment, of an alkali metal hydroxide solution of cellulose xanthate, acidifying the slurry to a pH below about 6 by the addition of sulfuric acid, and subsequently dewatering the slurry and drying the pigment at a temperature not in excess of about 150° C.

15. A process for producing a pigment of improved surface hiding power which comprises mixing with an aqueous suspension of a titanium oxide pigment between about 1% and about 8%, calculated as cellulose and based on the weight of the pigment before treatment, of an alkali metal hydroxide solution of cellulose xanthate, acidifying the slurry to a pH below about 6 by the addition of sulfuric acid, and subsequently dewatering the slurry and drying the pigment at a temperature not in excess of about 150° C.

16. A pigment of improved surface hiding power which comprises a lithopone pigment coated with between about 1% and about 8%, calculated as cellulose and based on the weight of the pigment before treatment of an acid-precipitated gel-like cellulosic compound.

17. A pigment of improved surface hiding power which comprises a titanium oxide pigment coated with between about 1% and about 8%, calculated as cellulose and based on the weight of the pigment before treatment of an acid-precipitated gel-like cellulosic compound.

MARION L. HANAHAN.